(12) United States Patent
Maruyama et al.

(10) Patent No.: US 10,311,331 B2
(45) Date of Patent: Jun. 4, 2019

(54) IMAGE PROCESSING APPARATUS, IMAGE PROCESSING SYSTEM, NON-TRANSITORY COMPUTER READABLE MEDIUM, AND IMAGE PROCESSING METHOD FOR REFLECTING FEATURES OF ONE IMAGE TO ANOTHER IMAGE

(71) Applicant: FUJI XEROX Co., Ltd., Tokyo (JP)

(72) Inventors: Kosuke Maruyama, Kanagawa (JP); Keiko Matsubayashi, Kanagawa (JP); Makoto Sasaki, Kanagawa (JP); Takayuki Yamamoto, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 36 days.

(21) Appl. No.: 15/246,638

(22) Filed: Aug. 25, 2016

(65) Prior Publication Data
US 2017/0206432 A1     Jul. 20, 2017

(30) Foreign Application Priority Data
Jan. 15, 2016     (JP) .................................. 2016-006683

(51) Int. Cl.
| | |
|---|---|
| *G06K 9/46* | (2006.01) |
| *G06K 9/52* | (2006.01) |
| *G06T 5/00* | (2006.01) |
| *G06T 5/40* | (2006.01) |
| *G06T 5/50* | (2006.01) |

(52) U.S. Cl.
CPC ......... *G06K 9/4671* (2013.01); *G06K 9/4642* (2013.01); *G06K 9/4652* (2013.01); *G06K 9/52* (2013.01); *G06T 5/00* (2013.01); *G06T 5/008* (2013.01); *G06T 5/40* (2013.01); *G06T 5/50* (2013.01); *G06K 2009/4666* (2013.01); *G06T 2207/10004* (2013.01); *G06T 2207/10016* (2013.01); *G06T 2207/20076* (2013.01); *G06T 2207/20104* (2013.01); *G06T 2207/20112* (2013.01); *G06T 2207/30168* (2013.01)

(58) Field of Classification Search
CPC ............. G06T 2207/20221; G06T 5/50; G06T 3/4038
See application file for complete search history.

(56) References Cited

U.S. PATENT DOCUMENTS

| | | | | |
|---|---|---|---|---|
| 2002/0037103 | A1* | 3/2002 | Hong | G06T 7/11 382/173 |
| 2002/0172419 | A1* | 11/2002 | Lin | G06K 9/0061 382/167 |

FOREIGN PATENT DOCUMENTS

| | | | |
|---|---|---|---|
| CN | 105096354 | * | 11/2015 |
| JP | 2007-053543 A | | 3/2007 |
| JP | 2014-007611 A | | 1/2014 |

* cited by examiner

*Primary Examiner* — Euengnan Yeh
(74) *Attorney, Agent, or Firm* — Sughrue Mion, PLLC (57) ABSTRACT

An image processing apparatus includes a feature value extractor and an image adjuster. The feature value extractor extracts feature values of a first specified image, which is an image of a region specified in advance in a first image. The image adjuster changes, in a case where the feature values of the first specified image are to be reflected in a second image, for each region of the second image, a degree to which the feature values of the first specified image are to be reflected, and adjusts an image quality of the second image.

17 Claims, 6 Drawing Sheets

| No. | CONDITIONS REGARDING SPECIFIED PROCESSING TARGET IMAGE | DEGREE OF REFLECTION TO NON-SPECIFIED IMAGE |
|---|---|---|
| 1 | SPECIFIED PROCESSING TARGET IMAGE >> NON-SPECIFIED IMAGE | 5 (LARGE) |
| 2 | SPECIFIED PROCESSING TARGET IMAGE > NON-SPECIFIED IMAGE | 4 |
| 3 | SPECIFIED PROCESSING TARGET IMAGE = NON-SPECIFIED IMAGE | 3 |
| 4 | SPECIFIED PROCESSING TARGET IMAGE < NON-SPECIFIED IMAGE | 2 |
| 5 | SPECIFIED PROCESSING TARGET IMAGE << NON-SPECIFIED IMAGE | 1 (SMALL) |

…

IMAGE PROCESSING APPARATUS, IMAGE PROCESSING SYSTEM, NON-TRANSITORY COMPUTER READABLE MEDIUM, AND IMAGE PROCESSING METHOD FOR REFLECTING FEATURES OF ONE IMAGE TO ANOTHER IMAGE

CROSS-REFERENCE TO RELATED APPLICATIONS

This application is based on and claims priority under 35 USC 119 from Japanese Patent Application No. 2016-006683 filed Jan. 15, 2016.

BACKGROUND (i) Technical Field

The present invention relates to an image processing apparatus, an image processing system, a non-transitory computer readable medium, and an image processing method.

(ii) Related Art

With the widespread use of digital cameras and the like, the number of users who capture and view digital images is increasing. Further, with the widespread use of smartphones and tablet computers, there has been an increasing demand for more intuitive operations for image quality adjustment, which is performed by using image editing software for personal computers (PCs), in order to obtain desired images.

The image quality of digital images may be adjusted by adjusting the component values of chromaticity, brightness, hue, and saturation in a color space, such as a Red-Green-Blue (RGB) color space, a CIE L*a*b* color space, or a Hue-Saturation-Value (HSV) color space, or the contrast thereof, for example. In this adjustment, a user specifies an image that serves as a sample, and image processing is performed in which the image quality of a processing target image is adjusted to the image quality of the sample image in some cases.

SUMMARY

According to an aspect of the invention, there is provided an image processing apparatus including a feature value extractor and an image adjuster. The feature value extractor extracts feature values of a first specified image, which is an image of a region specified in advance in a first image. The image adjuster changes, in a case where the feature values of the first specified image are to be reflected in a second image, for each region of the second image, a degree to which the feature values of the first specified image are to be reflected, and adjusts an image quality of the second image.

BRIEF DESCRIPTION OF THE DRAWINGS

Exemplary embodiments of the present invention will be described in detail based on the following figures, wherein.

DETAILED DESCRIPTION

Description of Image Processing

Hereinafter, exemplary embodiments of the present invention will be described in detail with reference to the attached drawings.

FIGS. 1A and 1B and FIGS. 2A and 2B are diagrams illustrating image processing for adjusting the image quality of a processing target image to the image quality of a sample image.

Figure 1A:
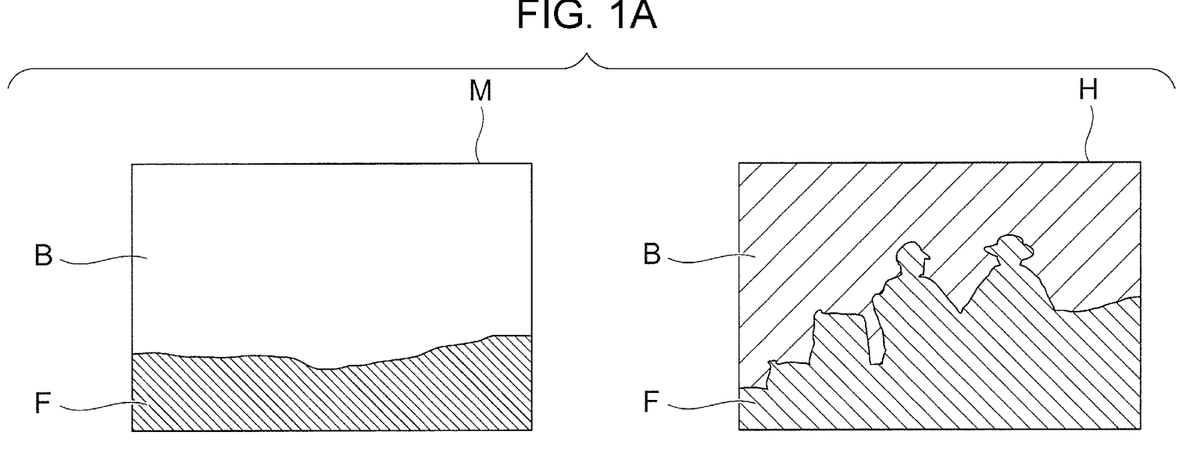
FIGS. 1A and 1B are diagrams illustrating image processing for adjusting the image quality of a processing target image to the image quality of a sample image.

FIG. 1A illustrates a sample image and a processing target image before image processing. Here, a sample image M is illustrated on the left of FIG. 1A, and a processing target image H is illustrated on the right of FIG. 1A. In the exemplary embodiments, a processing target image is an image that is subjected to image processing, and a sample image is an image that includes an image having an impression which a user desires and that serves as a sample used when image processing is performed on the processing target image. In the exemplary embodiments, a sample image is used as an example of a first image, and a processing target image is used as an example of a second image.

Typically, the sample image M and the processing target image H are displayed on a display device, such as a liquid crystal panel or a liquid crystal display. Image processing is performed by processing image information using image editing software that runs on a tablet computer, a smartphone, a PC, or the like. The user performs an operation for image processing by operating a menu and the like displayed on the display device together with the sample image M and the processing target image H in accordance with operations of the image editing software. In a case of using a tablet computer or a smartphone, the user operation is performed by the user touching the liquid crystal panel, which is a touch panel, with a finger or a stylus, for example. In a case of using a PC, the user operation is performed by using a keyboard, a mouse, and the like connected to the PC. In the above-described cases, a functional unit of the tablet computer or the smartphone which performs image processing and the PC are each regarded as an example of an image processing apparatus that performs image processing on image information regarding an image displayed on the display device. Further, the image processing apparatus and the display device are together regarded as an example of an image processing system.

The sample image M and the processing target image H illustrated in FIG. 1A are each formed of a foreground F, which is an image of the ground, and a background B, which is an image of the sky.

Here, it is assumed that the user wants to change the processing target image H to an image having an impression similar to that of the background B of the sample image M by performing image processing on the processing target image H. This case corresponds to a case of, if the background B of the sample image M is an image of a red sky, and the background B of the processing target image H is an image of a blue sky, changing the background B of the processing target image H to the image of a red sky, for example.

Figure 1B:
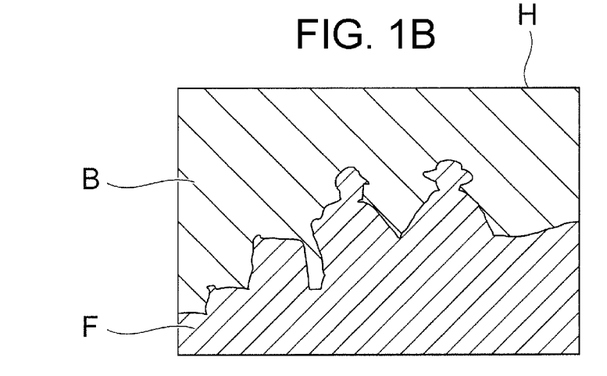

FIG. 1B illustrates the processing target image H after image processing performed by using a method according to the related art.

In the processing target image H after image processing illustrated in FIG. 1B, the color of the background B becomes closer to the color of the background B of the sample image M, and therefore, an image impression received from the processing target image H becomes closer to that received from the sample image M. Further, in the processing target image H after image processing, image processing has been performed not only on the background B, which is an image of the sky, but also on the foreground F, which is an image of the ground, because the entire processing target image H has been subjected to image processing. However, in the processing target image H, only one type of light produced by a light source, namely, natural light, illuminates a subject. Therefore, even if the entire processing target image H is subjected to image processing, the processing result is natural.

Figure 2A:
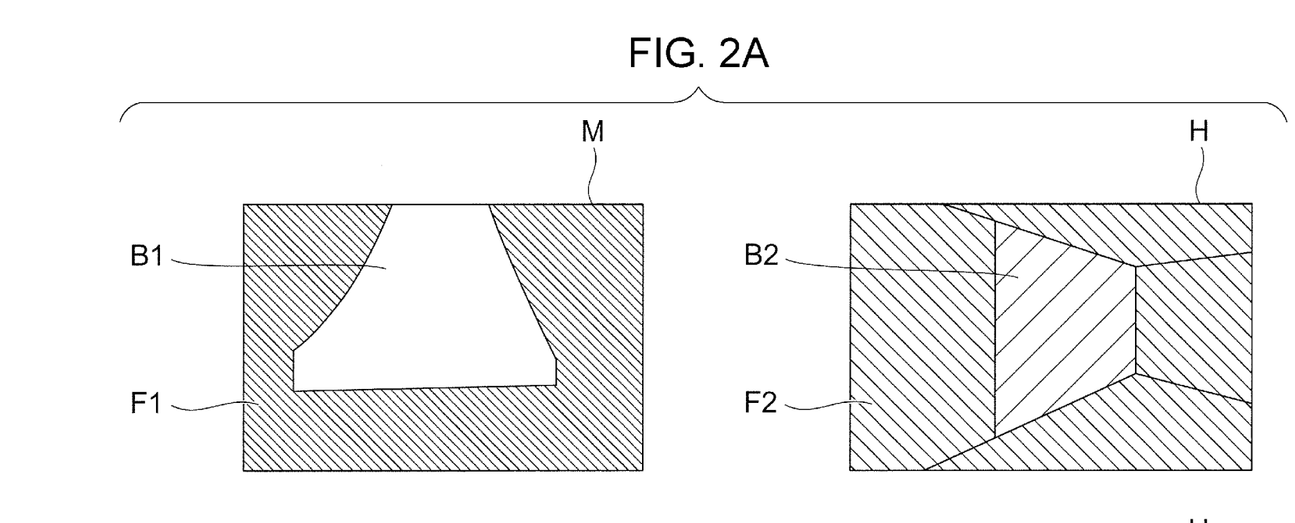
FIGS. 2A and 2B are diagrams illustrating image processing for adjusting the image quality of a processing target image to the image quality of a sample image.

FIG. 2A illustrates a sample image and a processing target image before image processing different from those in FIG. 1A. Here, a sample image M is illustrated on the left of FIG. 2A, and a processing target image H is illustrated on the right of FIG. 2A. The illustrated sample image M and processing target image H are each an image of a room having a window. The sample image M is formed of a foreground F1, which is an image of a room, the room being a dark region, and a background B1, which is an image of an outdoor scene having a high lightness level due to illumination by natural light. The processing target image H is formed of a foreground F2, which is an image of a room having a high lightness level due to illumination by illumination light, and a background B2, which is an image of an outdoor scene having a high lightness level due to illumination by natural light. In other words, one type of light, namely, natural light produced by a natural light source, is present and illuminates a subject in the sample image M while two types of light, namely, indoor illumination light produced by an artificial light source and natural light produced by a natural light source, are present and illuminate a subject in the processing target image H.

Here, it is assumed that a user wants to change the background B2 of the processing target image H to an image having an impression similar to that of the background B1 of the sample image M by performing image processing on the processing target image H. That is, it is assumed that the user wants to make the impression of the outdoor scene from the window in the processing target image H similar to the impression of the outdoor scene from the window in the sample image M. This case corresponds to a case of, if the natural light in the sample image M is twilight, the background B1 is an image of a red sky, the natural light in the processing target image H is daylight, and the background B2 is an image of a blue sky, changing the background B2 of the processing target image H to an image of a red sky, for example.

Figure 2B:
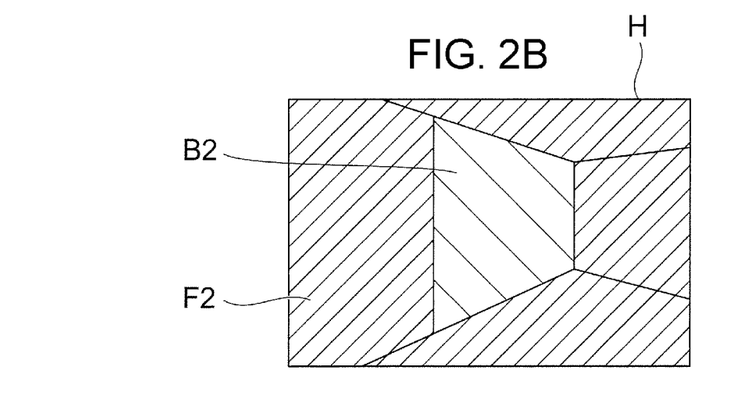

FIG. 2B illustrates the processing target image H after image processing performed by using a method according to the related art.

In the processing target image H after image processing illustrated in FIG. 2B, the entire processing target image H is subjected to image processing. In other words, image processing is performed on the background B2 of the processing target image H, and image processing is also performed on the foreground F2 of the processing target image H. In such a case, the indoor illumination light in the foreground F2 is affected by the natural light in the sample image M, and the color of the illumination light in the foreground F2 is changed to red, which may result in a noticeable change in the impression of the whole room.

In the exemplary embodiments, in a case of adjusting the image quality of a processing target image to the image quality of a sample image, a degree to which the image quality of the sample image is to be reflected is set for each region of the processing target image, and image processing is performed. Specifically, in the example illustrated in FIGS. 2A and 2B, the image quality is adjusted so that the background B2 of the processing target image H has an impression similar to that of the background B1 of the sample image M and so that the effect of the background B1 of the sample image M is suppressed in the foreground F2 of the processing target image H. As described above, by changing the degree to which the image quality of a sample image is to be reflected for each region of a processing target image, the image quality is adjusted in accordance with the user's intention.

Hereinafter, a description of an image processing apparatus and so on for implementing the above-described operation is given.

Description of Configuration of Image Processing Apparatus

First Exemplary Embodiment

A description of a first exemplary embodiment is given first.

Figure 3:
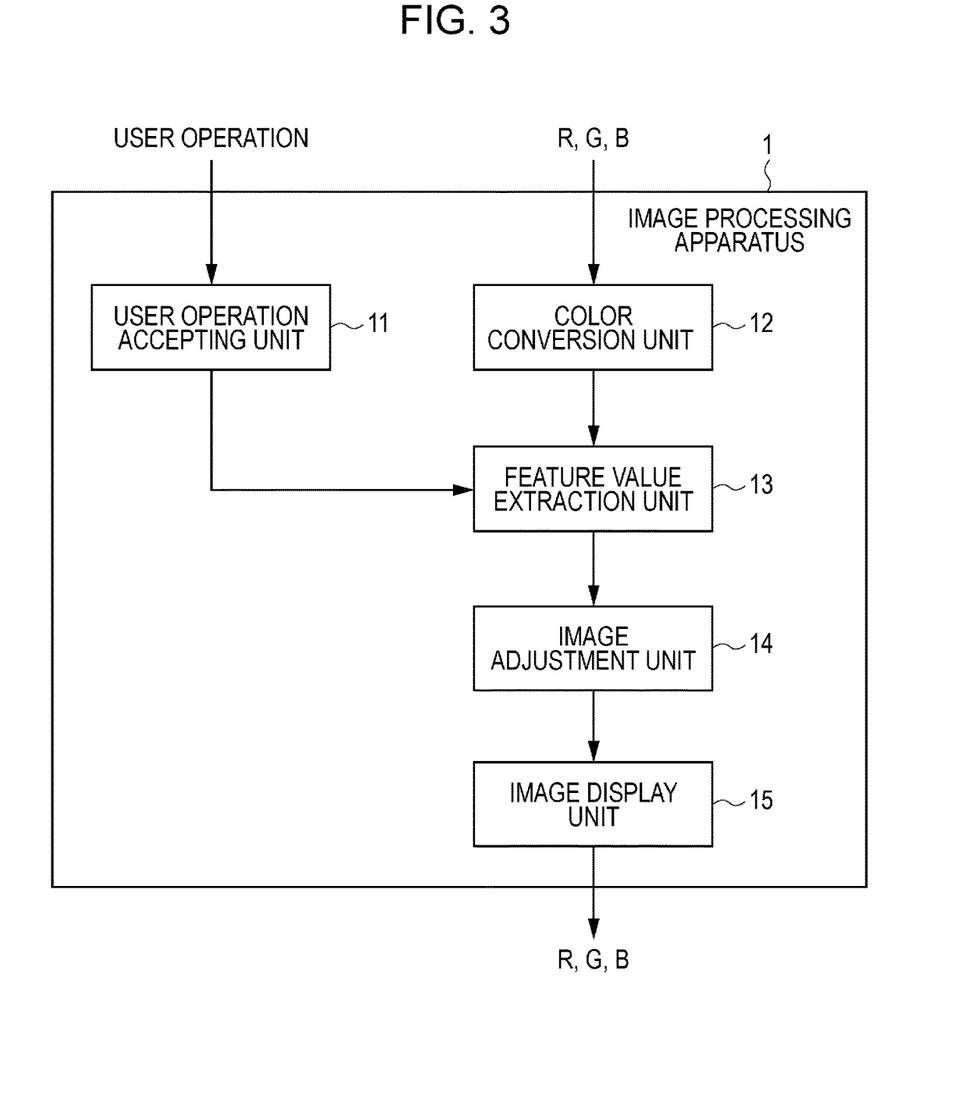
FIG. 3 is a block diagram illustrating an example functional configuration of an image processing apparatus according to exemplary embodiments.

FIG. 3 is a block diagram illustrating an example functional configuration of an image processing apparatus 1 according to this exemplary embodiment.

As illustrated in FIG. 3, the image processing apparatus 1 includes a user operation accepting unit 11, a color conversion unit 12, and a feature value extraction unit 13. The user operation accepting unit 11 accepts the details of a user operation. The color conversion unit 12 obtains image information (input image data) regarding a processing target image and a sample image, performs color conversion, and obtains chromaticity components and brightness components. The feature value extraction unit 13 extracts feature values from image information obtained after color conversion. The image processing apparatus 1 further includes an image adjustment unit 14 and an image display unit 15. The image adjustment unit 14 performs a process for adjusting feature values of the processing target image to feature values of the sample image. The image display unit 15 displays, on a display device, the processing target image in which the feature values of the sample image have been reflected.

The user operation accepting unit 11 accepts a control signal that indicates the details of an operation performed by a user on a processing target image or a sample image. This operation, which will be described in detail below, corresponds to an operation of touching or dragging on a touch panel by using a finger or a stylus in a case where the user operates a tablet computer or a smartphone. In a case where the user operates a PC, the operation corresponds to an operation of clicking or dragging by using a mouse or the like.

The color conversion unit 12 performs color conversion on input image data that is used to display a processing target image and a sample image on the display device. In this case, the input image data is RGB video data (RGB data). The RGB data is converted into IPT data, for example. That is, the chromaticity in an RGB color space is converted into the chromaticity in an IPT color space. An IPT color space is an orthogonal coordinate color space composed of three components of lightness (I), chromaticity in the red-green direction (P), and chromaticity in the yellow-blue direction (T). In this exemplary embodiment, lightness (I) is assumed to be a brightness component, and chromaticity in the red-green direction (P) and chromaticity in the yellow-blue direction (T) are assumed to be chromaticity components.

The feature value extraction unit 13, which is an example of a feature value extractor, extracts feature values from image information regarding the processing target image and the sample image after color conversion. The feature value extraction unit 13 extracts feature values of an image of a region specified by the user in the sample image (hereinafter referred to as a specified sample image). The feature value extraction unit 13 extracts feature values of an image of a region specified by the user in the processing target image (hereinafter referred to as a specified processing target image). The feature value extraction unit 13 further extracts feature values of an image of a region not specified by the user in the processing target image (hereinafter referred to as a non-specified image). In other words, the feature value extraction unit 13 extracts feature values of a non-specified image, which is an image of a region other than the region of the specified processing target image in the processing target image. In this exemplary embodiment, a specified sample image is used as an example of a first specified image, a specified processing target image is used as an example of a second specified image, and a non-specified image is used as an example of a second non-specified image.

A description is given below while assuming a configuration in which a user specifies a specified sample image and a specified processing target image; however, this exemplary embodiment is not limited to such a configuration. A specified sample image and a specified processing target image may be images of regions specified in advance in accordance with a certain criterion, or images that are not specified by the user but are specified in accordance with the outlines or color distributions thereof may be used as a specified sample image and a specified processing target image respectively, for example.

Feature values are indicators that determine the impression of an image received by a user who views the image. In this exemplary embodiment, the mean and the distribution of the pixel values of pixels that constitute a specified processing target image are assumed to be feature values of the specified processing target image, the mean and the distribution of the pixel values of pixels that constitute a non-specified image are assumed to be feature values of the non-specified image, and the mean and the distribution of the pixel values of pixels that constitute a specified sample image are assumed to be feature values of the specified sample image. A pixel value is composed of a brightness component (I) and chromaticity components (P, T). Accordingly, feature values are extracted for each of the brightness component (I) and the chromaticity components (P, T). Note that, in this exemplary embodiment, an arithmetic mean is used as the mean, and a variance is used as the distribution.

More specifically, the feature value extraction unit 13 calculates the arithmetic means of the brightness components (I) and the chromaticity components (P, T) of pixels that constitute a specified processing target image, calculates the arithmetic means of the brightness components (I) and the chromaticity components (P, T) of pixels that constitute a non-specified image, and calculates the arithmetic means of the brightness components (I) and the chromaticity components (P, T) of pixels that constitute a specified sample image. Further, the feature value extraction unit 13 calculates the variances of the brightness components (I) and the chromaticity components (P, T) of the pixels that constitute the specified processing target image, calculates the variances of the brightness components (I) and the chromaticity components (P, T) of the pixels that constitute the non-specified image, and calculates the variances of the brightness components (I) and the chromaticity components (P, T) of the pixels that constitute the specified sample image.

The arithmetic mean is calculated for each of the specified processing target image, the non-specified image, and the specified sample image and for each of I, P, and T, which represent the brightness component and the chromaticity components, and therefore, nine values are obtained in total. The arithmetic means are calculated by using expressions 1 below.

In expressions 1, $I_{i,j}$ represents the I value of each pixel at a position (i, j) that constitutes a specified processing target image, a non-specified image, or a specified sample image, $P_{i,j}$ represents the P value of each pixel at the position (i, j) that constitutes the specified processing target image, the non-specified image, or the specified sample image, and $T_{i,j}$ represents the T value of each pixel at the position (i, j) that constitutes the specified processing target image, the non-specified image, or the specified sample image.

$\mu_{It}$ represents the arithmetic mean of the I values of the specified processing target image. $\mu_{Pt}$ represents the arithmetic mean of the P values of the specified processing target image. $\mu_{Tt}$ represents the arithmetic mean of the T values of the specified processing target image.

$\mu_{Itg}$ represents the arithmetic mean of the I values of the non-specified image. $\mu_{Ptg}$ represents the arithmetic mean of the P values of the non-specified image. $\mu_{Ttg}$ represents the arithmetic mean of the T values of the non-specified image.

$\mu_{Ir}$ represents the arithmetic mean of the I values of the specified sample image. $\mu_{Pr}$ represents the arithmetic mean of the P values of the specified sample image. $\mu_{Tr}$ represents the arithmetic mean of the T values of the specified sample image.

$$\mu_{It} = \frac{1}{ij}\sum (I_{i,j}), \quad \mu_{Pt} = \frac{1}{ij}\sum (P_{i,j}), \quad \mu_{Tt} = \frac{1}{ij}\sum (T_{i,j}) \qquad (1)$$

$$\mu_{Itg} = \frac{1}{ij}\sum (I_{i,j}), \quad \mu_{Ptg} = \frac{1}{ij}\sum (P_{i,j}), \quad \mu_{Ttg} = \frac{1}{ij}\sum (T_{i,j})$$

$$\mu_{Ir} = \frac{1}{ij}\sum (I_{i,j}), \quad \mu_{Pr} = \frac{1}{ij}\sum (P_{i,j}), \quad \mu_{Tr} = \frac{1}{ij}\sum (T_{i,j})$$

The variance is also calculated for each of the specified processing target image, the non-specified image, and the specified sample image and for each of I, P, and T, which represent the brightness component and the chromaticity components, and therefore, nine values are obtained in total. The variances are calculated by using expressions 2 below.

In expressions 2, $I_{i,j}$, $P_{i,j}$, and $T_{i,j}$ represent the respective values as in expressions 1.

$\sigma_{It}^2$ represents the variance of the I values of the specified processing target image. $\sigma_{Pt}^2$ represents the variance of the P values of the specified processing target image. $\sigma_{Tr}^2$ represents the variance of the T values of the specified processing target image.

$\sigma_{Itg}^2$ represents the variance of the I values of the non-specified image. $\sigma_{Ptg}^2$ represents the variance of the P values of the non-specified image. $\sigma_{Ttg}^2$ represents the variance of the T values of the non-specified image.

$\sigma_{Ir}^2$ represents the variance of the I values of the specified sample image. $\sigma_{Pr}^2$ represents the variance of the P values of the specified sample image. $\sigma_{Tr}^2$ represents the variance of the T values of the specified sample image.

$$\sigma_{It}^2 = \frac{1}{ij}\sum (I_{i,j} - \mu_{It})^2, \quad \sigma_{Pt}^2 = \frac{1}{ij}\sum (P_{i,j} - \mu_{Pt})^2, \quad (2)$$

$$\sigma_{Tt}^2 = \frac{1}{ij}\sum (T_{i,j} - \mu_{Tt})^2$$

$$\sigma_{Itg}^2 = \frac{1}{ij}\sum (I_{i,j} - \mu_{Itg})^2, \quad \sigma_{Ptg}^2 = \frac{1}{ij}\sum (P_{i,j} - \mu_{Ptg})^2,$$

$$\sigma_{Ttg}^2 = \frac{1}{ij}\sum (T_{i,j} - \mu_{Ttg})^2$$

$$\sigma_{Ir}^2 = \frac{1}{ij}\sum (I_{i,j} - \mu_{Ir})^2, \quad \sigma_{Pr}^2 = \frac{1}{ij}\sum (P_{i,j} - \mu_{Pr})^2,$$

$$\sigma_{Tr}^2 = \frac{1}{ij}\sum (T_{i,j} - \mu_{Tr})^2$$

The image adjustment unit 14, which is an example of an image adjuster, adjusts feature values of a processing target image in accordance with feature values of a specified sample image to adjust the image quality of the processing target image. Here, the image adjustment unit 14 sets a degree to which feature values of a specified processing target image are to be adjusted to feature values of a specified sample image (hereinafter referred to as a weighting value α) and a degree to which feature values of a non-specified image are to be adjusted to the feature values of the specified sample image (hereinafter referred to as a weighting value β). In other words, the weighting value α is regarded as a degree to which feature values of a specified sample image are to be reflected to feature values of a specified processing target image, and the weighting value β is regarded as a degree to which the feature values of the specified sample image are to be reflected to feature values of a non-specified image. In this exemplary embodiment, the weighting value α is used as an example of a first reflection degree, and the weighting value β is used as an example of a second reflection degree.

The image adjustment unit 14 sets the weighting value α and the weighting value β to different values. More specifically, the image adjustment unit 14 sets the weighting value β to a value smaller than that of the weighting value α and adjusts the image quality of a processing target image. In other words, in a case where feature values of a specified sample image are to be reflected in a processing target image, the image adjustment unit 14 changes the degree to which the feature values of the specified sample image are to be reflected for each region included in the processing target image and adjusts the image quality of the processing target image.

Note that the weighting value α and the weighting value β have values within a range between 0 and 1. The weighting value β is smaller than the weighting value α, and therefore, has a value smaller than 1. The weighting value α and the weighting value β are set in accordance with a certain rule, such as user settings, for example. In a case where a user sets the weighting value α, the numerical value is determined by the user entering a specific numerical value or selecting one from among three levels of "high", "medium", and "low", for example. The weighting value β is set to a value smaller than the weighting value α by multiplying the set value of the weighting value α by a coefficient, for example.

In a case where feature values of a specified processing target image are adjusted to feature values of a specified sample image, the image adjustment unit 14 uses the arithmetic means and the variances of the brightness components and the chromaticity components of the specified processing target image and those of the specified sample image. The image adjustment unit 14 performs a process for making the arithmetic means and the variances of the specified processing target image closer to the arithmetic means and the variances of the specified sample image.

In a case where feature values of a non-specified image are adjusted to feature values of a specified sample image, the image adjustment unit 14 uses the arithmetic means and the variances of the brightness components and the chromaticity components of the non-specified image and those of the specified sample image. The image adjustment unit 14 performs a process for making the arithmetic means and the variances of the non-specified image closer to the arithmetic means and the variances of the specified sample image.

These processes are performed by using expressions 3 to 8 below, for example. Among these expressions, expressions 3 to 5 are used in the case where feature values of a specified processing target image are adjusted to feature values of a specified sample image. In expressions 3 to 5, $\alpha_{i,j}$ represents the weighting value α, and the weighting value α is calculated for each pixel at the position (i, j) that constitutes the specified processing target image. Expressions 6 to 8 are used in the case where feature values of a non-specified image are adjusted to feature values of a specified sample image. In expressions 6 to 8, $\beta_{i,j}$ represents the weighting value β, and the weighting value β is calculated for each pixel at the position (i, j) that constitutes the non-specified image.

The weighting value α is set for each pixel of a specified processing target image; however, it is assumed in this exemplary embodiment that the weighting value α for each pixel of a specified processing target image is set to the same value. Further, the weighting value β is set for each pixel of a non-specified image; however, it is assumed in this exemplary embodiment that the weighting value β for each pixel of a non-specified image is set to the same value.

Among expressions 3 to 5, expression 3 is an arithmetic expression for I values, where $I_{i,j}$ represents the I value of each pixel at the position (i, j) that constitutes a specified processing target image before adjustment, and $I'_{i,j}$ represents the I value of each pixel at the position (i, j) that constitutes the specified processing target image after adjustment.

Expression 4 is an arithmetic expression for P values, where $P_{i,j}$ represents the P value of each pixel at the position (i, j) that constitutes the specified processing target image before adjustment, and $P'_{i,j}$ represents the P value of each pixel at the position (i, j) that constitutes the specified processing target image after adjustment.

Expression 5 is an arithmetic expression for T values, where $T_{i,j}$ represents the T value of each pixel at the position (i, j) that constitutes the specified processing target image before adjustment, and $T_{i,j}$ represents the T value of each pixel at the position (i, j) that constitutes the specified processing target image after adjustment.

By calculating expressions 3 to 5, the brightness component (I) and the chromaticity components (P, T) are adjusted in accordance with the specified sample image for each pixel at the position (i, j) that constitutes the specified processing target image.

$$I'_{i,j} = \alpha_{i,j}\left((I_{i,j} - \mu_{It})\frac{\sigma_{Ir}^2}{\sigma_{It}^2} + \mu_{Ir}\right) \quad (3)$$

$$P'_{i,j} = \alpha_{i,j}\left((P_{i,j} - \mu_{Pt})\frac{\sigma_{Pr}^2}{\sigma_{Pt}^2} + \mu_{Pr}\right) \quad (4)$$

$$T'_{i,j} = \alpha_{i,j}\left((T_{i,j} - \mu_{Tt})\frac{\sigma_{Tr}^2}{\sigma_{Tt}^2} + \mu_{Tr}\right) \quad (5)$$

Among expressions 6 to 8, expression 6 is an arithmetic expression for I values, where $I_{i,j}$ represents the I value of each pixel at the position (i, j) that constitutes a non-specified image before adjustment, and $I'_{i,j}$ represents the I value of each pixel at the position (i, j) that constitutes the non-specified image after adjustment.

Expression 7 is an arithmetic expression for P values, where $P_{i,j}$ represents the P value of each pixel at the position (i, j) that constitutes the non-specified image before adjustment, and $P'_{i,j}$ represents the P value of each pixel at the position (i, j) that constitutes the non-specified image after adjustment.

Expression 8 is an arithmetic expression for T values, where $T_{i,j}$ represents the T value of each pixel at the position (i, j) that constitutes the non-specified image before adjustment, and $T'_{i,j}$ represents the T value of each pixel at the position (i, j) that constitutes the non-specified image after adjustment.

By calculating expressions 6 to 8, the brightness component (I) and the chromaticity components (P, T) are adjusted in accordance with the specified sample image for each pixel at the position (i, j) that constitutes the non-specified image.

$$I'_{i,j} = \beta_{i,j}\left((I_{i,j} - \mu_{Itg})\frac{\sigma_{Ir}^2}{\sigma_{Itg}^2} + \mu_{Ir}\right) \quad (6)$$

$$P'_{i,j} = \beta_{i,j}\left((P_{i,j} - \mu_{Ptg})\frac{\sigma_{Pr}^2}{\sigma_{Ptg}^2} + \mu_{Pr}\right) \quad (7)$$

$$T'_{i,j} = \beta_{i,j}\left((T_{i,j} - \mu_{Ttg})\frac{\sigma_{Tr}^2}{\sigma_{Ttg}^2} + \mu_{Tr}\right) \quad (8)$$

Figure 4A:
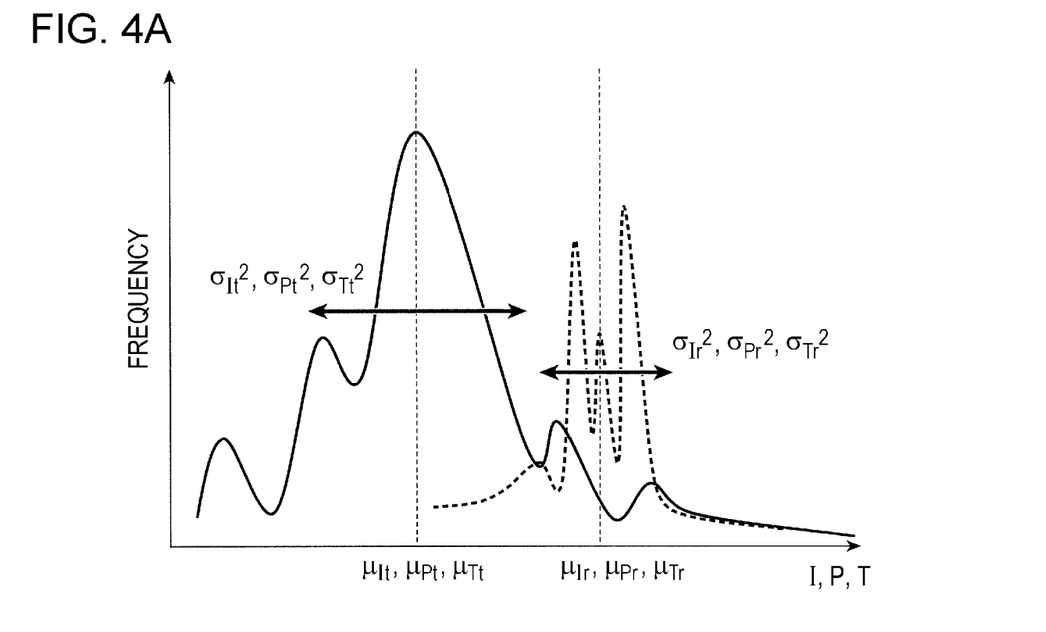
FIG. 4A is a conceptual diagram illustrating a histogram of a specified processing target image and that of a specified sample image before image processing.

FIG. 4A is a conceptual diagram illustrating a histogram of a specified processing target image and that of a specified sample image before image processing.

In FIG. 4A, the horizontal axis represents the brightness component or the chromaticity component, namely, the I value, the P value, or the T value. The vertical axis represents the frequency (number of pixels). Here, the solid line represents a histogram of a specified processing target image, and the dotted line represents a histogram of a specified sample image. In this case, the arithmetic mean $\mu_{It}$ (or $\mu_{Pt}$ or $\mu_{Tt}$) of the specified processing target image is different from the arithmetic mean $\mu_{Ir}$ (or $\mu_{Pr}$ or $\mu_{Tr}$) of the specified sample image because image processing has not been performed. The variance $\sigma_{It}^2$ (or $\sigma_{Pt}^2$ or $\sigma_{Tt}^2$) of the specified processing target image is also different from the variance $\sigma_{Tr}^2$ (or $\sigma_{Pr}^2$ or $\sigma_{Tr}^2$) of the specified sample image.

Here, in a process for adjusting feature values of the specified processing target image to feature values of the specified sample image, a process for making the arithmetic means of the specified processing target image closer to the arithmetic means of the specified sample image and making the variances of the specified processing target image closer to the variances of the specified sample image is performed.

Figure 4B:
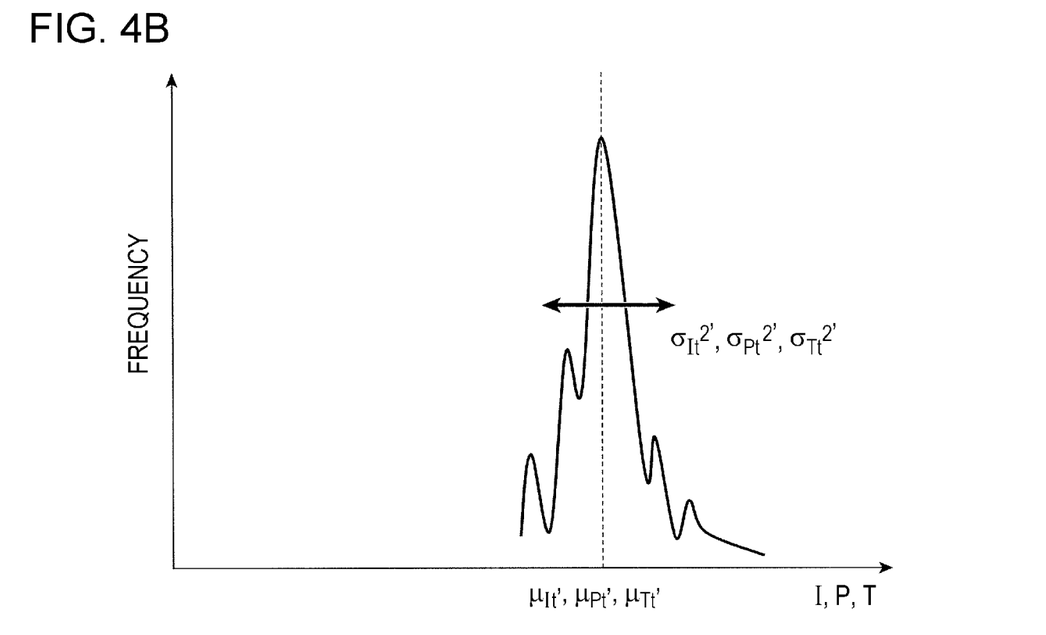
FIG. 4B is a conceptual diagram illustrating a histogram of the specified processing target image after a brightness component and chromaticity components have been adjusted by an image adjustment unit.

FIG. 4B is a conceptual diagram illustrating a histogram of the specified processing target image after the brightness component and the chromaticity components have been adjusted by the image adjustment unit 14. FIG. 4B illustrates an example case where the weighting value α is set to 1.

In FIG. 4B, the horizontal axis represents the brightness component or the chromaticity component, namely, the I value, the P value, or the T value. The vertical axis represents the frequency (number of pixels). In this case, the weighting value α is equal to 1, and therefore, the arithmetic means of the specified processing target image match the arithmetic means of the specified sample image after the brightness component and the chromaticity components have been adjusted by the image adjustment unit 14. The variances of the specified processing target image also match the variances of the specified sample image.

The example illustrated in FIGS. 4A and 4B is the case where feature values of a specified processing target image are adjusted to feature values of a specified sample image. Feature values of a non-specified image are also adjusted to feature values of a specified sample image in a similar manner. That is, in a process for adjusting feature values of a non-specified image to feature values of a specified sample image, a process for making the arithmetic means of the non-specified image closer to the arithmetic means of the specified sample image and making the variances of the non-specified image closer to the variances of the specified sample image is performed. The weighting value β is smaller than 1, and therefore, the arithmetic means of the non-specified image do not match the arithmetic means of the specified sample image and the variances of the non-specified image do not match the variances of the specified sample image unlike the example illustrated in FIG. 4B.

The image display unit 15 displays on the display device the processing target image in which the feature values of the sample image have been reflected.

Figure 5:
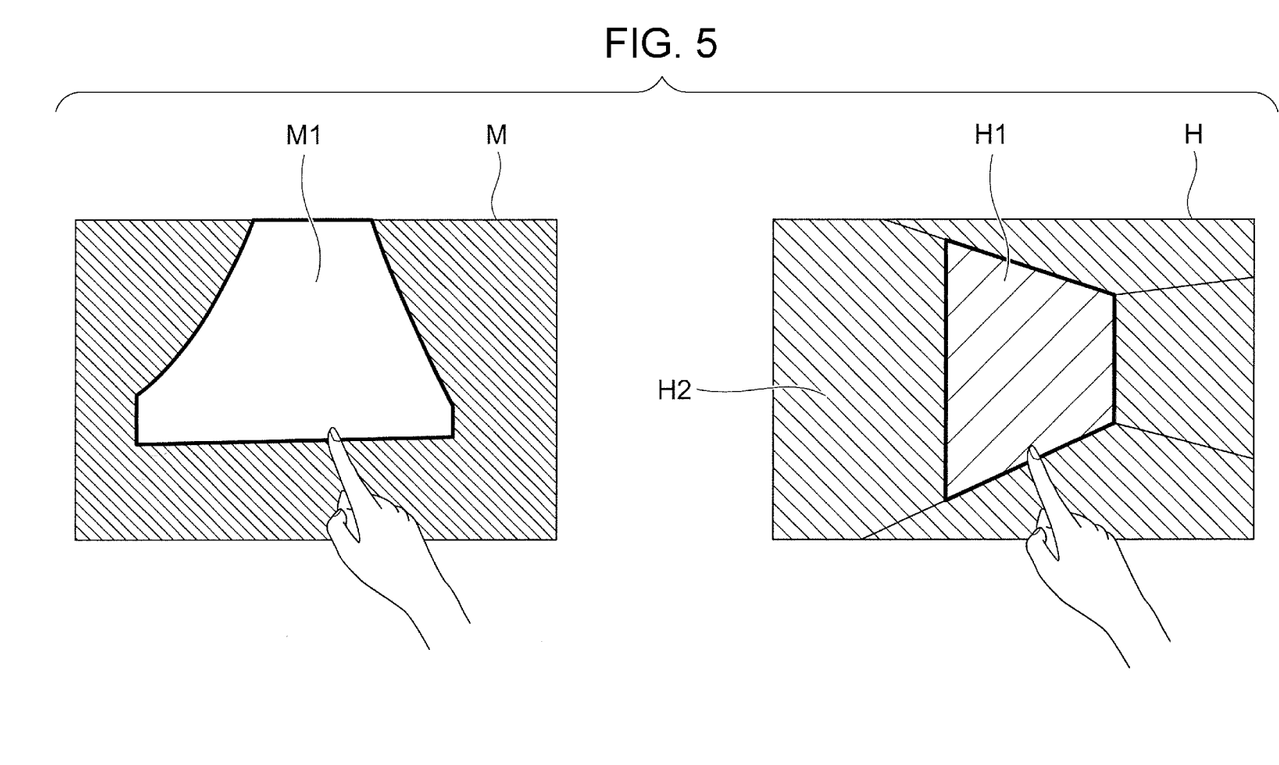
FIG. 5 is a diagram for describing example processing performed in a first exemplary embodiment.

FIG. 5 is a diagram for describing example processing performed in the first exemplary embodiment.

FIG. 5 illustrates the sample image M and the processing target image H illustrated in FIG. 2A. The sample image M is illustrated on the left of FIG. 5, and the processing target image H is illustrated on the right of FIG. 5. Here, it is assumed that a user wants to change the processing target image H to an image having an impression similar to that of the background B1 of the sample image M (see FIG. 2A) by performing image processing on the processing target image H.

A specified sample image M1 outlined by a bold line corresponds to the background B1 of the sample image M (see FIG. 2A). A specified processing target image H1 outlined by a bold line corresponds to the background B2 of the processing target image H (see FIG. 2A). The image of a region other than the region of the specified processing target image H1 corresponds to a non-specified image H2. Hereinafter, a description is given while assuming that the user uses a tablet computer or a smartphone and performs an operation by touching the display device with a finger or a stylus, for example.

The user first touches any location on the perimeter (edge) of the specified processing target image H1 with a finger or a stylus and thereafter moves the finger or the stylus on the processing target image H without releasing the finger or the stylus to thereby perform a drag operation. This drag operation is an operation for the user to specify the specified processing target image H1 in the processing target image H and is accepted by the user operation accepting unit 11. In other words, the user operation accepting unit 11 accepts an image outlined by a path, produced by the finger or the stylus, on the processing target image H as the specified processing target image H1. In a case where this operation is performed by using a mouse or the like, the operation is such that the user clicks any location on the perimeter (edge) of the specified processing target image H1 and thereafter performs a drag operation without releasing the mouse button.

Next, the user touches with a finger or a stylus (or clicks in the case of using a mouse or the like) any location on the perimeter (edge) of the specified sample image M1 and thereafter moves the finger or the stylus on the sample image M without releasing the finger or the stylus to thereby perform a drag operation. This drag operation is an operation for the user to specify the specified sample image M1 in the sample image M and is accepted by the user operation accepting unit 11. In other words, the user operation accepting unit 11 accepts an image outlined by a path, produced by the finger or the stylus, on the sample image M as the specified sample image M1.

Here, the specified processing target image H1 corresponds to the background B2 (see FIG. 2A), in which an outdoor scene from a window is visible, and is an image having the color of daylight, such as an image of a blue sky, for example. The non-specified image H2 corresponds to the foreground F2 (see FIG. 2A), which is an image of a room illuminated by illumination light, and is an image having the color of illumination light. The specified sample image M1 corresponds to the background B1 (see FIG. 2A), in which an outdoor scene from a window is visible, and is an image having the color of twilight, such as an image of a red sky, for example.

The feature value extraction unit 13 extracts feature values of the specified processing target image H1, those of the non-specified image H2, and those of the specified sample image M1. Next, the image adjustment unit 14 adjusts feature values of the processing target image H to the feature values of the specified sample image M1 in accordance with the feature values of the specified processing target image H1, those of the non-specified image H2, and those of the specified sample image M1 extracted by the feature value extraction unit 13. Here, $I'_{i,j}$ and $T'_{i,j}$ expressed by expressions 3 to 5 described above correspond to image data of the specified processing target image H1 after image processing, and $I'_{i,j}$, $P'_{i,j}$, and $T'_{i,j}$ expressed by expressions 6 to 8 described above correspond to image data of the non-specified image H2 after image processing. That is, the degree to which the feature values of the specified sample image M1 are to be reflected is adjusted in accordance with the weighting value α and the weighting value β.

As a result, the feature values of the specified sample image M1 are reflected in the specified processing target image H1, and therefore, an image impression received from the specified processing target image H1 becomes closer to an image impression received from the specified sample image M1. Specifically, the color of natural light in the specified processing target image H1 changes to the color of twilight from the color of daylight, that is, the image of a blue sky changes to an image of a red sky. Regarding the non-specified image H2, the degree to which the feature values of the specified sample image M1 are to be reflected is adjusted so as to be smaller than that for the specified processing target image H1. That is, in the non-specified image H2, the effect of the natural light in the specified sample image M1 is suppressed so that the impression of indoor illumination light in the non-specified image H2 does not noticeably change. In other words, in this exemplary embodiment, it is regarded that feature values of a specified processing target image are based on the impression of light in the specified processing target image, feature values of a non-specified image are based on the impression of light in the non-specified image, and feature values of a specified sample image are based on the impression of light in the specified sample image.

In actuality, the image display unit 15 converts again $I'_{i,j}$, $P'_{i,j}$, and $T'_{i,j}$ which correspond to image data after image processing, into the format of input image data obtained by the color conversion unit 12 and outputs the result to the display device. That is, the image display unit 15 restores the IPT data to RGB data and outputs the RGB data to the display device, and the processing target image after image processing is displayed on the display device.

As described above, in this exemplary embodiment, with image processing performed by the image adjustment unit 14, the degree to which the image quality of a specified sample image is to be reflected is set for each of the specified processing target image and the non-specified image in a processing target image, and image processing is thereafter performed. Accordingly, the impression of light in the specified processing target image is adjusted to the impression of light in the specified sample image while the impression of light in the non-specified image is such that the effect of the light in the specified sample image is suppressed. Accordingly, by changing the degree to which the image quality of a specified sample image is to be reflected for each region of a processing target image, the image quality is adjusted in accordance with the user's intention.

In the example described above, a specified processing target image is specified through a user operation; however, a region for which the user wants to change the image impression may be specified in a non-specific manner in a manual operation. Assuming such a case, if a portion having a color close to the color of a region specified by the user is present in the vicinity of the specified region, for example, a specified processing target image may be set while automatically including the portion. In this case, the feature value extraction unit 13 calculates the mean of chromaticity data (for example, IPT data) of the region specified by the user. The feature value extraction unit 13 sets a specified processing target image while including pixels that are in the vicinity of the region specified by the user and that have chromaticity data within a predetermined range from the calculated mean, and extracts feature values of the specified processing target image.

In the example described above, the case is described where plural types of light that illuminate a subject are present in a processing target image and feature values of a specified sample image are reflected; however, this exemplary embodiment is not limited to this case. This exemplary embodiment is applicable to a case where one type of light is present in a processing target image. Further, one or more types of light may be present in a sample image.

Note that, in the example illustrated in FIG. 5, the specified processing target image H1 and the specified sample image M1 have a quadrilateral shape and a hexagonal shape respectively; however, the specified processing target image H1 and the specified sample image M1 may have any shapes, such as a triangular shape and a circular shape.

Second Exemplary Embodiment

Now, a description of a second exemplary embodiment is given.

In the first exemplary embodiment, the weighting value β that is used to adjust feature values of a non-specified image to feature values of a specified sample image is set to the same value for the pixels of the non-specified image. In this exemplary embodiment, the weighting value β is calculated for each pixel that constitutes the non-specified image in accordance with information regarding the pixel of the non-specified image while following a predetermined rule. Specifically, in this exemplary embodiment, the value of the weighting value β is calculated on the basis of the distance from the specified processing target image.

An example functional configuration of the image processing apparatus 1 of this exemplary embodiment is similar to that illustrated in FIG. 3. The functions of the user operation accepting unit 11, the color conversion unit 12, the feature value extraction unit 13, and the image display unit 15 are similar to those in the first exemplary embodiment. Therefore, a description of the image adjustment unit 14, which is different from the first exemplary embodiment, is given below.

In this exemplary embodiment, the image adjustment unit 14 performs similar processing as in the first exemplary embodiment for a specified processing target image and causes feature values of a specified sample image to be reflected to feature values of the specified processing target image. For a non-specified image, the image adjustment unit 14 adjusts the weighting value β for each pixel of the non-specified image in accordance with the distance from a predetermined position of the specified processing target image to the pixel of the non-specified image.

As the predetermined position of the specified processing target image, the image adjustment unit 14 identifies the position of the center of gravity that is present in the figure represented by the specified processing target image, for example. The image adjustment unit 14 calculates, for each pixel of the non-specified image, the distance from the center of gravity and calculates the weighting value β in accordance with the calculated distance. Here, the weighting value β is set to a larger value as the distance from the center of gravity is shorter, and the weighting value β is set to a smaller value as the distance from the center of gravity is longer. A calculation used to convert the distance from the center of gravity into the weighting value β may be any calculation. The weighting value β is calculated by multiplying the distance from the center of gravity by a specific coefficient, for example.

After the weighting value β has been calculated for each pixel of the non-specified image, image processing on the non-specified image is performed. The image processing is performed by using the above-described expressions 6 to 8 as in the first exemplary embodiment. That is, $\beta_{i,j}$ in expressions 6 to 8 is assigned the weighting value β calculated for each pixel of the non-specified image.

As described above, in this exemplary embodiment, with image processing performed by the image adjustment unit 14, feature values of a specified sample image are reflected for each pixel of a non-specified image in accordance with the distance from the specified processing target image. That is, for a non-specified image, the degree to which feature values of a specified sample image are to be reflected increases as the distance from the specified processing target image is shorter, and the degree to which the feature values of the specified sample image are to be reflected decreases as the distance from the specified processing target image is longer. In other words, in a non-specified image, the effect of light in a specified sample image is reflected to a larger degree as the distance from the specified processing target image is shorter.

In the example described above, the predetermined position of a specified processing target image is assumed to be the center of gravity, and the weighting value β is set in accordance with the distance from the center of gravity; however, this exemplary embodiment is not limited to this example. The predetermined position of a specified processing target image may be set to a position on the perimeter (edge) of the specified processing target image, and the weighting value β may be set in accordance with the distance from the perimeter, for example.

Third Exemplary Embodiment

Now, a description of a third exemplary embodiment is given.

In this exemplary embodiment, the weighting value β is calculated for each pixel that constitutes a non-specified image in accordance with information regarding the pixel of the non-specified image while following a predetermined rule as in the second exemplary embodiment. Specifically, in this exemplary embodiment, the value of the weighting value β is calculated on the basis of the color distribution of the non-specified image.

An example functional configuration of the image processing apparatus 1 of this exemplary embodiment is similar to that illustrated in FIG. 3. The functions of the user operation accepting unit 11, the color conversion unit 12, the feature value extraction unit 13, and the image display unit 15 are similar to those in the first exemplary embodiment. Therefore, a description of the image adjustment unit 14, which is different from the first exemplary embodiment, is given below.

In this exemplary embodiment, the image adjustment unit 14 performs similar processing as in the first exemplary embodiment for a specified processing target image and causes feature values of a specified sample image to be reflected to feature values of the specified processing target image. For a non-specified image, the image adjustment unit 14 adjusts the weighting value β for each pixel that constitutes the non-specified image in accordance with the color distribution of the non-specified image, that is, in accordance with the difference between the pixel value of the pixel of the non-specified image and the mean of the pixel values of the pixels of the specified processing target image.

The image adjustment unit 14 obtains the chromaticity (RGB values) of a processing target image in an RGB color space before color conversion by the color conversion unit 12, for example. Next, the image adjustment unit 14 calculates the mean of the RGB values of the pixels in the specified processing target image. Here, the image adjustment unit 14 calculates the mean (arithmetic mean, for example) of each of the R values, G values, and B values of the pixels in the specified processing target image. Subsequently, the image adjustment unit 14 calculates the difference between the pixel value (RGB values) of each pixel in the non-specified image and the mean pixel value (RGB values) of the specified processing target image and calculates the weighting value β in accordance with the calculated difference. Here, the weighting value β is set to a larger value as the difference between the pixel values decreases, and the weighting value β is set to a smaller value as the difference between the pixel values increases. A calculation used to convert the difference between the pixel values into the weighting value β may be any calculation. The weighting value β is calculated by multiplying the difference between the pixel values by a specific coefficient, for example.

Here, the difference between the pixel value of each pixel in the non-specified image and the mean pixel value of the specified processing target image is calculated by using the following expression 9.

In expression 9, $L_{i,j}$ represents the difference between the pixel value of each pixel at the position (i, j) that constitutes a non-specified image and the mean pixel value of a specified processing target image. $R_{i,j}$ represents the R value of each pixel at the position (i, j) that constitutes the non-specified image, $G_{i,j}$ represents the G value of each pixel at the position (i, j) that constitutes the non-specified image, and $B_{i,j}$ represents the B value of each pixel at the position (i, j) that constitutes the non-specified image. $R_0$ represents the mean R value of the specified processing target image, $G_0$ represents the mean G value of the specified processing target image, and $B_0$ represents the mean B value of the specified processing target image.

$$L_{i,j}=\sqrt{(R_0-R_{i,j})^2+(G_0-G_{i,j})^2+(B_0-B_{i,j})^2} \quad (9)$$

After the pixel value difference has been calculated for each pixel of the non-specified image by using expression 9, the weighting value β is calculated for the pixel. Thereafter, image processing is performed on the non-specified image. This image processing is performed similarly as in the first exemplary embodiment by using the above-described expressions 6 to 8. That is, $β_{i,j}$ in expressions 6 to 8 is assigned the weighting value β calculated for each pixel of the non-specified image.

As described above, in this exemplary embodiment, with image processing performed by the image adjustment unit 14, feature values of a specified sample image are reflected for each pixel of a non-specified image in accordance with the difference from the mean pixel value of the specified processing target image. That is, for a non-specified image, the degree to which feature values of a specified sample image are to be reflected increases as the difference from the mean pixel value of the specified processing target image decreases, and the degree to which the feature values of the specified sample image are to be reflected decreases as the difference from the mean pixel value of the specified processing target image increases.

In other words, in a non-specified image, the effect of light in a specified sample image is reflected to a larger degree as the color of the non-specified image is closer to the color of the specified processing target image before image processing. Therefore, even in a case where a region for which a user wants to change the image impression is specified in a non-specific manner, the effect of the light in the specified sample image is reflected to a larger degree in a portion having a color closer to the color of the region specified by the user. Further, in the non-specified image, a portion that is affected by light in the specified processing target image before image processing and that has an impression similar to that of the specified processing target image is adjusted so that, even after image processing, the impression of the portion is still close to the impression of the specified processing target image after image processing.

In the example described above, the weighting value β is set in accordance with the difference in the values of RGB data; however, this exemplary embodiment is not limited to the example. Chromaticity data in any color space that includes a brightness component and a chromaticity component may be used, and IPT data, CIE L*a*b* data, Lαβ data, CAM02 data, or HSV data may be used instead of RGB data, for example.

Fourth Exemplary Embodiment

Now, a description of a fourth exemplary embodiment is given.

In this exemplary embodiment, the weighting value β is set to the same value for the pixels of a non-specified image and is calculated in accordance with the ratio of the specified processing target image relative to the entire processing target image.

An example functional configuration of the image processing apparatus 1 of this exemplary embodiment is similar to that illustrated in FIG. 3. The functions of the user operation accepting unit 11, the color conversion unit 12, the feature value extraction unit 13, and the image display unit 15 are similar to those in the first exemplary embodiment. Therefore, a description of the image adjustment unit 14, which is different from the first exemplary embodiment, is given below.

In this exemplary embodiment, the image adjustment unit 14 performs similar processing as in the first exemplary embodiment for a specified processing target image and causes feature values of a specified sample image to be reflected to feature values of the specified processing target image. For a non-specified image, the image adjustment unit 14 adjusts the weighting value β in accordance with the ratio of the specified processing target image relative to the entire processing target image.

The image adjustment unit 14 calculates the ratio of a specified processing target image relative to the entire processing target image and calculates the weighting value β in accordance with the calculated ratio, for example. Here, the weighting value β is set to a larger value as the ratio of the specified processing target image relative to the entire processing target image increases, and the weighting value β is set to a smaller value as the ratio of the specified processing target image relative to the entire processing target image decreases. A calculation used to convert the ratio of the specified processing target image into the weighting value β may be any calculation. The weighting value β is calculated by multiplying the ratio by a specific coefficient, for example.

Figure 6:
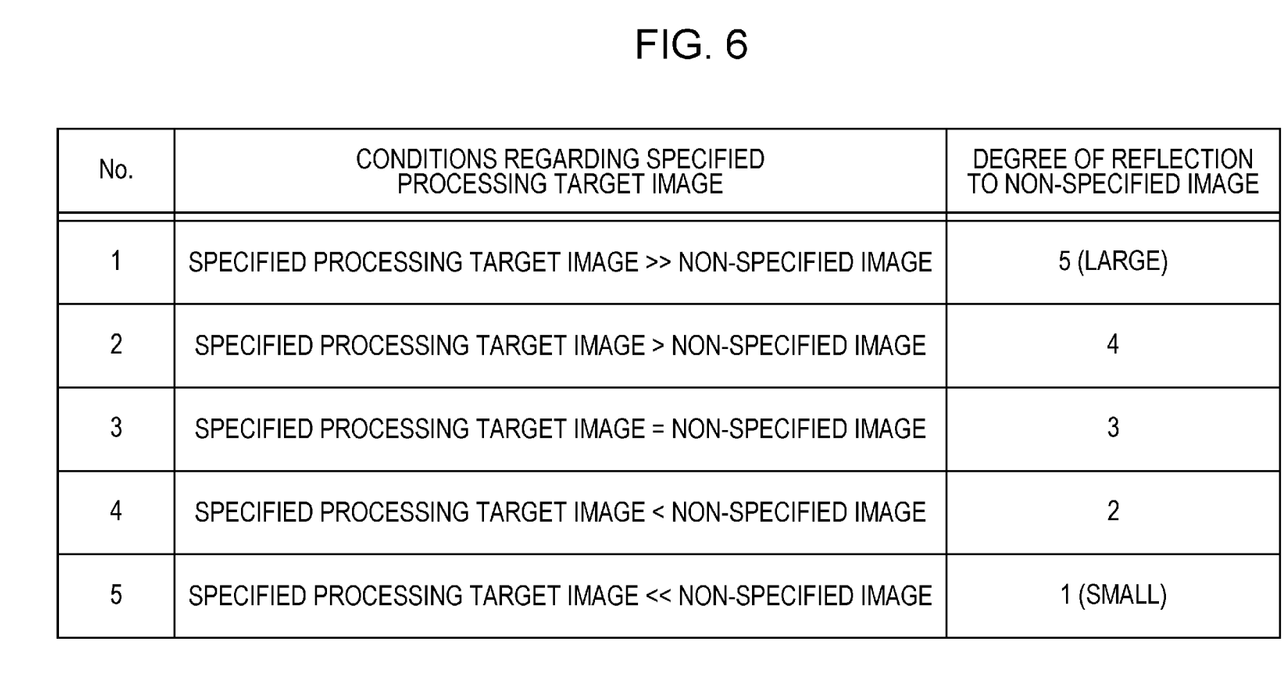
FIG. 6 is a diagram for describing example processing of calculating a weighting value β from the ratio of a specified processing target image.

FIG. 6 is a diagram for describing example processing of calculating the weighting value β from the ratio of a specified processing target image. In the illustrated example, the degree of reflection is classified into five levels represented by Nos. 1 to 5 in accordance with the ratio of the specified processing target image relative to the entire processing target image. For example, the case No. 1 is a case where the specified processing target image is much larger than the non-specified image and the ratio of the specified processing target image relative to the entire processing target image is largest among the cases Nos. 1 to 5. The ratio of the specified processing target image relative to the entire processing target image decreases in the order of No. 1 to No. 5, and the weighting value β decreases in the order of No. 1 to No. 5. In the illustrated example, the degree of reflection to the non-specified image is represented by five levels ranging from 1 to 5, for example. The weighting value β is calculated on the basis of the degree of reflection, for example.

After the weighting value β has been calculated for the non-specified image, image processing is performed on the non-specified image. This image processing is performed similarly as in the first exemplary embodiment by using the above-described expressions 6 to 8. That is, $β_{i,j}$ in expressions 6 to 8 is assigned the weighting value β calculated for the non-specified image.

As described above, in this exemplary embodiment, with image processing performed by the image adjustment unit 14, feature values of a specified sample image are reflected in a non-specified image in accordance with the ratio of the specified processing target image relative to the entire processing target image. That is, for a non-specified image, the degree to which feature values of a specified sample image are to be reflected increases as the ratio of the specified processing target image relative to the entire processing target image increases, and the degree to which the feature values of the specified sample image are to be reflected decreases as the ratio of the specified processing target image relative to the entire processing target image decreases. As a result, the effect of light in the specified sample image is reflected in the non-specified image to a larger degree as the specified processing target image occupies a larger portion of the processing target image.

Note that, in this exemplary embodiment, the weighting value β is set to the same value for the pixels of a non-specified image; however, this exemplary embodiment is not limited to this. This exemplary embodiment may be combined with processing in the third exemplary embodiment or the fourth exemplary embodiment, and the weighting value β may be calculated for each pixel that constitutes a non-specified image on the basis of information regarding the pixel.

Fifth Exemplary Embodiment

Now, a description of a fifth exemplary embodiment is given.

In the first to fourth exemplary embodiments, feature values of a specified sample image are reflected in a non-specified image. In this exemplary embodiment, in addition to feature values of a specified sample image, feature values of an image of a region in the sample image other than the region of the specified sample image are also reflected in a non-specified image.

An example functional configuration of the image processing apparatus 1 of this exemplary embodiment is similar to that illustrated in FIG. 3. The functions of the user operation accepting unit 11, the color conversion unit 12, and the image display unit 15 are similar to those in the first exemplary embodiment. Therefore, a description of the feature value extraction unit 13 and the image adjustment unit 14, which are different from the first exemplary embodiment, is given below.

In this exemplary embodiment, the feature value extraction unit 13 extracts, for a processing target image, feature values of the specified processing target image and feature values of the non-specified image. The feature value extraction unit 13 extracts, for a sample image, feature values of the specified sample image. The feature value extraction unit 13 further extracts feature values of an image of a region not specified by a user in the sample image (hereinafter referred to as a non-specified sample image), that is, feature values of the non-specified sample image, which is an image of a region other than the region of the specified sample image in the sample image. In this exemplary embodiment, the non-specified sample image is used as an example of a first non-specified image.

The image adjustment unit 14 performs similar processing as in the first exemplary embodiment for a specified processing target image and causes feature values of a specified sample image to be reflected to feature values of the specified processing target image. For a non-specified image, the image adjustment unit 14 first causes feature values of a non-specified sample image to be reflected. Thereafter, the image adjustment unit 14 further causes, for the non-specified image, feature values of a specified sample image to be reflected.

Here, feature values of a non-specified sample image are calculated by using expressions 10 and 11. In expressions 10 and 11, $I_{i,j}$ represents the I value of each pixel at the position (i, j) that constitutes a non-specified sample image, $P_{i,j}$ represents the P value of each pixel at the position (i, j) that constitutes the non-specified sample image, and $T_{i,j}$ represents the T value of each pixel at the position (i, j) that constitutes the non-specified sample image.

$μ_{Irg}$ represents the arithmetic mean of the I values of the non-specified sample image, $μ_{Prg}$ represents the arithmetic mean of the P values of the non-specified sample image, and $μ_{Trg}$ represents the arithmetic mean of the T values of the non-specified sample image.

$σ_{Irg}^2$ represents the variance of the I values of the non-specified sample image, $σ_{Prg}^2$ represents the variance of the P values of the non-specified sample image, and $σ_{Trg}^2$ represents the variance of the T values of the non-specified sample image.

$$μ_{Irg} = \frac{1}{ij}\sum (I_{i,j}), \quad μ_{Prg} = \frac{1}{ij}\sum (P_{i,j}), \quad μ_{Trg} = \frac{1}{ij}\sum (T_{i,j}) \quad (10)$$

$$σ_{Irg}^2 = \frac{1}{ij}\sum (I_{i,j} - μ_{Irg})^2, \quad σ_{Prg}^2 = \frac{1}{ij}\sum (P_{i,j} - μ_{Prg})^2, \quad (11)$$

$$σ_{Trg}^2 = \frac{1}{ij}\sum (T_{i,j} - μ_{Trg})^2$$

The image adjustment unit 14 first performs a process for adjusting feature values of a non-specified image to feature values of a non-specified sample image. This process is performed by using the following expressions 12 to 14, for example. In expressions 12 to 14, $γ_{i,j}$ represents a weighting value γ, which is calculated for each pixel at the position (i, j) that constitutes the non-specified image. Here, the weighting value γ has a value within a range between 0 and 1 and is set in accordance with a certain rule, such as a user setting, for example. By specifying a relationship between the weighting value γ and the weighting value α or β in advance, the weighting value γ is determined in accordance with the value set for the weighting value α or β.

Among expressions 12 to 14, expression 12 is an arithmetic expression for I values, where $I_{i,j}$ represents the I value of each pixel at the position (i, j) that constitutes a non-specified image before adjustment, and $I'_{i,j}$ represents the I value of each pixel at the position (i, j) that constitutes the non-specified image after adjustment.

Expression 13 is an arithmetic expression for P values, where $P_{i,j}$ represents the P value of each pixel at the position (i, j) that constitutes the non-specified image before adjustment, and $P'_{i,j}$ represents the P value of each pixel at the position (i, j) that constitutes the non-specified image after adjustment.

Expression 14 is an arithmetic expression for T values, where $T_{i,j}$ represents the T value of each pixel at the position (i, j) that constitutes the non-specified image before adjustment, and $T'_{i,j}$ represents the T value of each pixel at the position (i, j) that constitutes the non-specified image after adjustment.

By calculating expressions 12 to 14, the brightness component (I) and the chromaticity components (P, T) are adjusted in accordance with the non-specified sample image for each pixel at the position (i, j) that constitutes the non-specified image.

$$I'_{i,j} = \gamma_{i,j}\left((I_{i,j} - \mu_{Itg})\frac{\sigma^2_{Irg}}{\sigma^2_{Itg}} + \mu_{Irg}\right) \quad (12)$$

$$P'_{i,j} = \gamma_{i,j}\left((P_{i,j} - \mu_{Ptg})\frac{\sigma^2_{Prg}}{\sigma^2_{Ptg}} + \mu_{Prg}\right) \quad (13)$$

$$T'_{i,j} = \gamma_{i,j}\left((T_{i,j} - \mu_{Ttg})\frac{\sigma^2_{Trg}}{\sigma^2_{Ttg}} + \mu_{Trg}\right) \quad (14)$$

Subsequently, the image adjustment unit 14 further performs a process for adjusting the feature values of the non-specified image to feature values of a specified sample image. This process is performed by using the above-described expressions 6 to 8. Here, as the weighting value β, the value calculated according to any of the first to fourth exemplary embodiment is used.

As described above, in this exemplary embodiment, feature values of a specified sample image and feature values of an image of a region other than the region of the specified sample image in the sample image are reflected in a non-specified image. That is, feature values of images of different regions are reflected in a non-specified image, and the image quality is adjusted.

Description of Program

The processing performed by the image processing apparatus 1 according to the exemplary embodiments is implemented by software and hardware resources working together. That is, a central processing unit (CPU) not illustrated, which is provided inside the image processing apparatus 1, executes a program for implementing functions of the image processing apparatus 1 to thereby implement the functions.

Accordingly, the processing performed by the image processing apparatus 1 may be regarded as a program causing a computer to execute a process for image processing, the process including: extracting feature values of a first specified image, which is an image of a region specified in advance in a first image; and changing, in a case where the feature values of the first specified image are to be reflected in a second image, for each region of the second image, a degree to which the feature values of the first specified image are to be reflected, and adjusting an image quality of the second image.

In the examples described above, although an arithmetic mean is used as the mean, the mean is not limited to an arithmetic mean and may be a geometric mean or the like. In the examples described above, although a variance is used as the distribution, the distribution is not limited to a variance, and various indicators, such as a root-mean-square or a standard deviation, may be used.

In the examples described above, although the color conversion unit 12 converts RGB data into IPT data, RGB data need not be converted into IPT data and may be converted into any chromaticity data in a color space including a brightness component and a chromaticity component. For example, RGB data is used without conversion into IPT data, or RGB data may be converted into CIE L*a*b* data, Lαβ data, CAM02 data, HSV data, or the like instead of IPT data. By using a color space, such as a CIE L*a*b* color space, which is perceptually uniform for a user's vision, or by using color conversion based on CIECAM2 or iCAM which takes into consideration a user's psychological vision and a user's physical vision, the impression after image processing becomes more natural.

In the examples described above, as the types of light, indoor illumination light produced by an artificial light source and natural light produced by a natural light source are used; however, the types of light is not limited to these. The types of indoor illumination light include warm color light and cool color light, for example. In a case where warm color illumination light and cool color illumination light are present in a processing target image, for example, with processing performed by the image adjustment unit 14, color conversion may be performed by changing the color of the warm color light or changing the color of the cool color light.

In the examples described above, although a processing target image is formed of a specified processing target image and a non-specified image, a processing target image is not limited to such a processing target image. In other words, in a processing target image, the non-specified image may be an image of the entire region other than the region of the specified processing target image or may be an image of a portion of the region other than the region of the specified processing target image. In the examples described above, a non-specified image is assumed to be an image of a region not specified by a user or the like. In a processing target image, in a case where the non-specified image is an image of a portion of the region other the region of the specified processing target image, the non-specified image may also be specified by a user or the like.

In the examples describe above, although a portion of a sample image is assumed to be a specified sample image, the entire sample image may be assumed to be a specified sample image.

The program for implementing the exemplary embodiments of the present invention may be provided via a communication system or may be stored in a recording medium, such as a compact disc read-only memory (CD-ROM), and provided therefrom.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one hardware processor configured to implement:
   a feature value extractor that extracts feature values of a first specified image, which is an image of a region specified in advance in a first image; and an image adjuster that changes, in a case where the feature values of the first specified image are to be reflected in a second image, for each region of the second image, a degree to which the feature values of the first specified image are to be reflected, and adjusts an image quality of the second image, wherein each region of the second image includes a specified region of the second image and a non-specified region of the second image, wherein the first image comprises a first foreground and a first background, wherein the second image comprises a second foreground and a second background, wherein the feature value extractor further extracts feature values of a second specified image, which is an image of a region specified in advance in the second image and includes the specified region, and feature values of a second non-specified image, which is an image of a region other than the region of the second specified image in the second image and includes the non-specified region, and wherein the image adjuster sets a first reflection degree and a second reflection degree to different values and adjusts the image quality of the second image, the first reflection degree being a degree to which the feature values of the first specified image are to be reflected to the feature values of the second specified image, the second reflection degree being a degree to which the feature values of the first specified image are to be reflected to the feature values of the second non-specified image.

2. The image processing apparatus according to claim 1, wherein
the feature value extractor calculates a mean and a distribution of pixel values of pixels that constitute an image as feature values of the image.

3. The image processing apparatus according to claim 1, wherein
the second reflection degree is smaller than the first reflection degree.

4. The image processing apparatus according to claim 1, wherein
the image adjuster adjusts the second reflection degree for each pixel that constitutes the second non-specified image in accordance with information regarding the pixel of the second non-specified image.

5. The image processing apparatus according to claim 4, wherein
the image adjuster adjusts the second reflection degree for each pixel that constitutes the second non-specified image by using, as the information regarding the pixel of the second non-specified image, a distance from a predetermine position of the second specified image to the pixel of the second non-specified image.

6. The image processing apparatus according to claim 4, wherein
the image adjuster adjusts the second reflection degree for each pixel that constitutes the second non-specified image by using, as the information regarding the pixel of the second non-specified image, a color distribution of the second non-specified image.

7. The image processing apparatus according to claim 1, wherein
the image adjuster adjusts the second reflection degree in accordance with a ratio of the second specified image relative to the entire second image.

8. The image processing apparatus according to claim 1, wherein
the feature value extractor further extracts feature values of a first non-specified image, which is an image of a region other than the region of the first specified image in the first image, and
the image adjuster causes the feature values of the first non-specified image to be reflected to the feature values of the second non-specified image and thereafter causes the feature values of the first specified image to be reflected to the feature values of the second non-specified image.

9. The image processing apparatus according to claim 1, wherein the image adjuster changes the specified region by a first degree,
wherein the image adjuster changes the non-specified region by a second degree, and
wherein the first degree is greater than the second degree.

10. The image processing apparatus according to claim 9, wherein the second degree differs from the first degree by distances of portions of the non-specified region from an edge of the specified region.

11. The image processing apparatus according to claim 9, wherein the second degree differs from the first degree by differences between color distributions of the feature values of the first specified image and respective pixels of the non-specified region.

12. The image processing apparatus according to claim 9, wherein the second degree differs from the first degree by a ratio between an area of the specified region to an area of the second image.

13. The image processing apparatus according to claim 9, wherein the second degree differs from the first degree by also reflecting other feature values of the first image from another region of the first image different than the region specified in advance in the first image.

14. The image processing apparatus according to claim 1, wherein the second image is obtained, by the at least one hardware processor, from video data.

15. An image processing system comprising:
a display device that displays an image; and
an image processing apparatus comprising at least one hardware processor configured to implement:
performing image processing on image information regarding the image displayed on the display device
a feature value extractor that extracts feature values of a first specified image, which is an image of a region specified in advance in a first image, and
an image adjuster that changes, in a case where the feature values of the first specified image are to be reflected in a second image, for each region of the second image, a degree to which the feature values of the first specified image are to be reflected, and adjusts an image quality of the second image,
wherein each region of the second image includes a specified region of the second image and a non-specified region of the second image,
wherein the first image comprises a first foreground and a first background,
wherein the second image comprises a second foreground and a second background,
wherein the at least one hardware processor is further configured to extract feature values of a second specified image, which is an image of a region specified in advance in the second image and includes the specified region, and feature values of a second non-specified image, which is an image of a region other than the region of the second specified image in the second image and includes the non-specified region, and wherein the image adjuster sets a first reflection degree and a second reflection degree to different values and adjusts the image quality of the second image, the first reflection degree being a degree to which the feature values of the first specified image are to be reflected to the feature values of the second specified image, the second reflection degree being a degree to which the feature values of the first specified image are to be reflected to the feature values of the second non-specified image.

16. A non-transitory computer readable medium storing a program causing a computer to execute a process for image processing, the process comprising:

extracting feature values of a first specified image, which is an image of a region specified in advance in a first image; and changing, in a case where the feature values of the first specified image are to be reflected in a second image, for each region of the second image, a degree to which the feature values of the first specified image are to be reflected, and adjusting an image quality of the second image, wherein each region of the second image includes a specified region of the second image and a non-specified region of the second image, wherein the first image comprises a first foreground and a first background, wherein the second image comprises a second foreground and a second background, and wherein the process further comprises:

extracting feature values of a second specified image, which is an image of a region specified in advance in the second image and includes the specified region, and feature values of a second non-specified image, which is an image of a region other than the region of the second specified image in the second image and includes the non-specified region; and setting a first reflection degree and a second reflection degree to different values and adjusts the image quality of the second image, the first reflection degree being a degree to which the feature values of the first specified image are to be reflected to the feature values of the second specified image, the second reflection degree being a degree to which the feature values of the first specified image are to be reflected to the feature values of the second non-specified image.

17. An image processing method comprising:

extracting feature values of a first specified image, which is an image of a region specified in advance in a first image; and changing, in a case where the feature values of the first specified image are to be reflected in a second image, for each region of the second image, a degree to which the feature values of the first specified image are to be reflected, and adjusting an image quality of the second image, wherein each region of the second image includes a specified region of the second image and a non-specified region of the second image, wherein the first image comprises a first foreground and a first background, and wherein the second image comprises a second foreground and a second background, and wherein the process further comprises:

extracting feature values of a second specified image, which is an image of a region specified in advance in the second image and includes the specified region, and feature values of a second non-specified image, which is an image of a region other than the region of the second specified image in the second image and includes the non-specified region; and setting a first reflection degree and a second reflection degree to different values and adjusts the image quality of the second image, the first reflection degree being a degree to which the feature values of the first specified image are to be reflected to the feature values of the second specified image, the second reflection degree being a degree to which the feature values of the first specified image are to be reflected to the feature values of the second non-specified image.

* * * * *